Patented Jan. 5, 1937

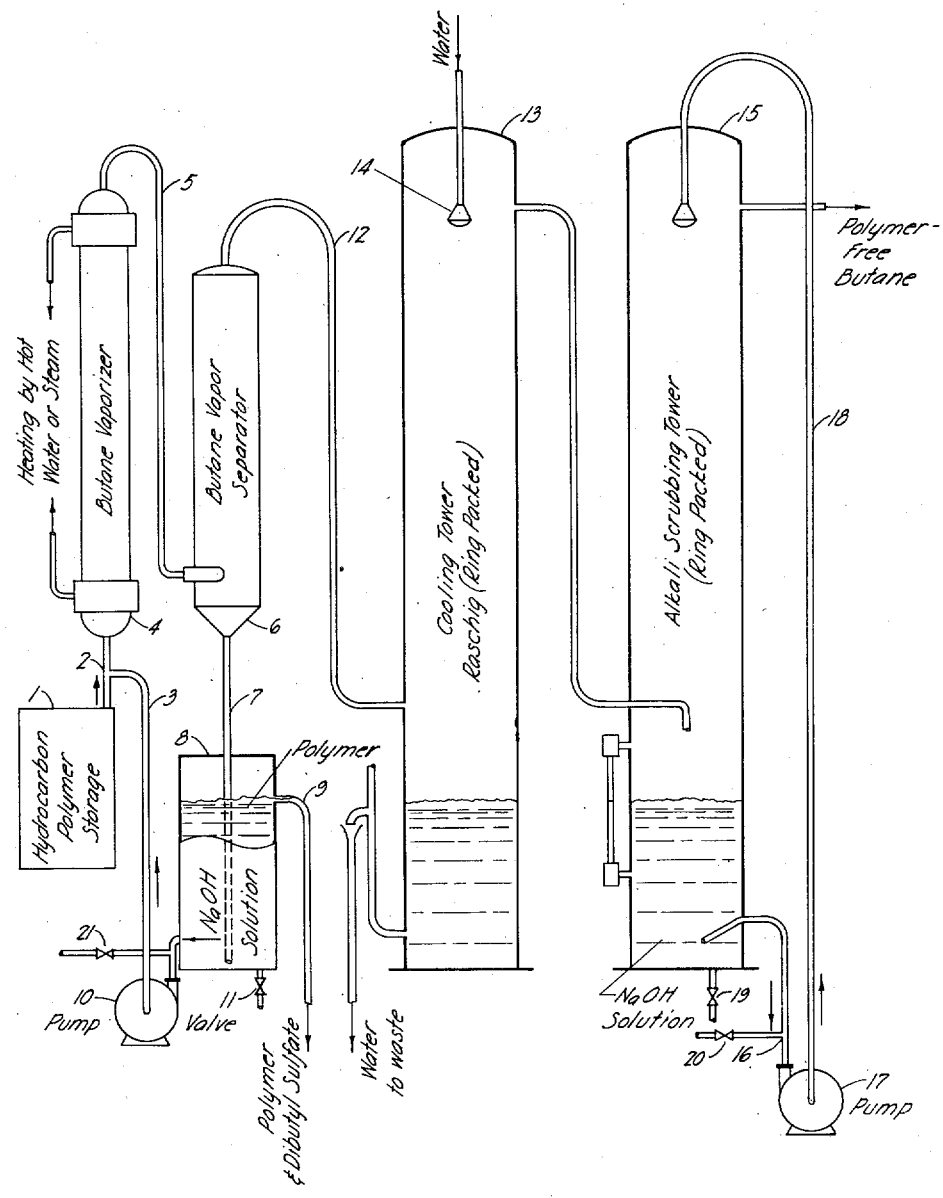

2,066,461

UNITED STATES PATENT OFFICE 2,066,461

PROCESS OF SEPARATING AND RECOVERING HYDROCARBONS AND ALKYL ESTERS FROM MIXTURES THEREOF

William Engs, Berkeley, Calif., assignor to Shell Development Company, San Francisco, Calif., a corporation of Delaware Application February 28, 1935, Serial No. 8,686

14 Claims. (Cl. 260—156)

This invention relates to the recovery of hydrocarbons from polymer and/or poly or neutral alkyl ester mixtures such as are obtained in the absorption of olefines in mineral acid acting acids, and particularly from such mixtures occurring in the manufacture of alcohols as upper layers on diluted or undiluted "acid liquors". It is especially concerned with a method and apparatus for securing the maximum hydrocarbon recovery from such mixtures in a simple, inexpensive manner while preventing undesirable decomposition of other valuable components of the mixture.

In the manufacture of alcohols, ethers, esters, and the like, from petroleum products, or other materials containing olefines, the olefinic content is more or less completely absorbed in a mineral acid acting acid of appropriate concentration. The unabsorbed hydrocarbons are subsequently separated from the resulting "acid liquor" which usually comprises an aqueous solution of acid esters with some free mineral acid acting acid and may contain free alcohol and/or low percentages of free hydrocarbons. Depending upon the extent to which the "acid liquor" is diluted prior to the separation of the immiscible hydrocarbons, the neutral esters and/or polymerized olefines present will be more or less completely removed with the unreacted hydrocarbons. The hydrocarbon phase thus separated serves as the starting material for the present invention and is typically composed of hydrocarbon polymer, poly and/or neutral alkyl esters, paraffin hydrocarbons, unreacted olefine and a small amount of free acid.

Heretofore such mixtures have been of little value and their disposal has involved many corrosion difficulties. In order to recover the hydrocarbon content for use as fuel, it has been necessary to subject these products to a refining process with sulfuric acid whereby the neutral esters present are completely lost. I have now found, however, that these difficulties may be entirely avoided and that not only may the neutral esters be recovered without substantial destructive decomposition, but also the hydrocarbons present may be isolated in a substantially pure form. Thus by my process a virtually waste product may be separated into valuable components.

I have discovered that contact with a suitable neutralizing agent, such, for example, as a caustic soda solution, restrains the decomposition of the neutral esters present in such mixtures as the above sufficiently during heating to temperatures up to about 180° F., so that very complete hydrocarbon recovery may be effected with very little (usually less than 1%) decomposition loss. My novel process of hydrocarbon recovery, based on these findings, comprises subjecting a hydrocarbon mixture separated from an olefine absorption product or "acid liquor" to distillation in admixture with a neutralizing agent, flashing off the volatile constituents and separating the remaining non-volatile constituents from the neutralizing agent.

My invention may be practiced with any suitable olefine or olefinic mixture regardless of the source or character of its olefine content. As suitable starting material, hydrocarbons derived from mineral oils as petroleum, shale oil, and the like, or from mineral oil products, or from natural gas, or from coal, peat and like carboniferous natural material, may be used as well as those derived from animal and vegetable oils, fats and waxes. The olefines present in such starting material may be of natural occurrence, the result of a dehydrogenation, distillation, vapor or liquid phase cracking, or other pyrogenetic treatment. The olefines may be used in a pure state, either as individual olefines or pure olefinic mixtures, or in admixture with paraffins or other compounds which may be considered as inert in the process. Furthermore, such olefines may comprise hydrocarbon fractions consisting of, or predominating in, hydrocarbons containing the same number of carbon atoms to the molecule, or of mixtures of non-isomeric hydrocarbons. Ethylene and/or secondary-base olefines (i. e. olefines, both iso and normal, which yield secondary derivatives, as propylene, butene-1, butene-2, $\alpha$ and $\beta$ amylene, isopropyl ethylene, and the like) and/or tertiary-base olefines (i. e. iso-olefines which yield tertiary derivatives, as isobutylene, trimethyl ethylene, 1,1 methyl-ethyl ethylene, and higher homologues and analogues) may thus be used.

Any suitable acid-acting medium may be used for the absorption of such olefines in the preparation of the hydrocarbon mixtures to which my invention is applicable. Thus, inorganic acids of which dithionic, sulfuric, phosphoric, pyrophosphoric, hydrochloric and nitric are typical; organic acids as benzene sulphonic, naphthalene sulphonic, toluene sulphonic and homologues and analogues thereof; and/or solutions or suspensions of acid-acting salts as sodium bisulfate, and the like, may be used.

The method or conditions chosen for carrying out the olefine absorption are not material to the successful execution of my invention, although the composition of the resulting hydrocarbon mixture which is the starting material in my novel process may be greatly effected thereby. This is particularly true of the polymer and poly or neutral alkyl ester content which may vary widely under different conditions of olefine absorption. In fact, either the poly or neutral ester content, for example, may even be negligibly small. Similarly any desired method may be used for separating the immiscible hydrocarbon phase from the absorption product and the separation may be effected with or without dilution of the absorption product and either before or after hydrolysis or other treatment thereof. In any case poly or neutral alkyl esters such, for example, as dipropyl sulfate, $(C_3H_7)_2SO_4$; dibutyl hydrogen phosphate, $(C_4H_9)_2HPO_4$; triamyl phosphate $(C_5H_{11})_3PO_4$, and the like, and/or free mineral acid acting acid will be present in the starting material of my process making it necessary to carry out the hydrocarbon recovery in the presence of a neutralizing agent if the best results are to be obtained.

For the purpose of affording a clear understanding of my invention, it will be described with more particular reference to the recovery of a pure butane-butene fraction from the residual hydrocarbon layer obtained in the preparation of secondary butyl alcohol. It will be understood, however, that I am not to be limited thereto as this is only one example of the possible applications of my invention.

The hydrocarbon mixture which will be used to illustrate this application of my process was prepared from a substantially pure butane-butene mixture which had been treated in the conventional manner to selectively remove the isobutylene present. The remaining hydrocarbons had, in a typical case, the following approximate composition:

| | Percent by volume |
|---|---|
| Butanes | 59.6 |
| Butene 1 and 2 | 38.4 |
| Isobutylene | 2.0 |

This mixture was agitated with 95% sulfuric acid at a temperature of about 80° to 100° F. for about half an hour and continuously discharged to a separator where the mixture was allowed to stratify into an "acid liquor" layer and an upper hydrocarbon layer which were withdrawn separately.

The example of the application of my invention to the production of a substantially pure butane-butene fraction from a hydrocarbon mixture such as this hydrocarbon layer may be best explained by reference to the accompanying drawing which is a "flow-sheet" or diagrammatic representation of the steps of my process in one of its modifications applicable to the manufacture of such products.

The hydrocarbon layer from the separator, as above described, has the following approximate composition:

| | Percent by weight |
|---|---|
| Polymer | 21.8 |
| Dibutyl sulfate | 11.9 |
| Butane | 63.1 |
| Butene 1 and 2 | 3.2 |

This mixture is fed from a storage tank 1, by a pipe line 2, to a vaporizing chamber 4. In pipe line 2 the hydrocarbons are admixed at connection 3 with a neutralizing agent, in this case a solution of about 10% by weight sodium hydroxide.

The vaporizing chamber shown is a jacketed cylinder heated by steam or hot water in which the unpolymerized hydrocarbons are vaporized and escape at the top through outlet pipe 5 carrying, by entrainment, the higher boiling components of the original mixture and the added neutralizing solution. The outlet pipe 5 is connected with the bottom of a vapor separator 6 where the butane-butene vapors are allowed to expand and separate from the polymers, dibutyl sulfate and sodium hydroxide solution. These higher boiling materials collect in the bottom and flow through outlet 7 to a settling tank 8, where the polymers and dibutyl sulfate, which are immiscible with the aqueous sodium hydroxide, separate as an upper layer which is drawn off through outlet 9. The sodium hydroxide solution is simultaneously withdrawn and re-fed, by pump 10, to the incoming hydrocarbon mixture in pipe 2, as described. An analytical test of the sodium hydroxide show that it is becoming exhausted as a result of neutralization by the sulfuric acid present in the mixtures treated, portions may be drawn off through valved drain 11 and replaced by fresh sodium hydroxide solution added through valved line 21.

When the substantially pure butane-butene mixture produced is to be stored under pressure or otherwise treated in any manner which requires compression, the vapors from separating chamber 6 may advantageously be cooled, as in tower 13, by injection of a water spray through a nozzle such as 14. As an extra precaution, for protection of the compressors, the cooled vapors may then be given a final scrubbing with alkali in another packed tower 15 through which a caustic solution is circulated by pump 17 and pipe lines 16 and 18. In this caustic scrubbing tower, a valved drain 19 is provided for withdrawal of spent alkali solution which may be replaced by fresh solution added through valved line 21.

A very pure butane-butene fraction, composed of approximately 95.2% butane and 4.8% butenes (by weight) and free from acid, is thus obtained. After compression or other condensation treatment, it is eminently suited for motor fuel or solvent use without danger of corrosion or decomposition difficulties. At the same time, the polymer mixture recovered from settling tank 8 has the following approximate composition:

| | Percent by weight |
|---|---|
| Dibutyl sulfate | 31.9 |
| Polymer | 58.9 |
| Butane | 9.2 |

This represents a dibutyl sulfate recovery of about 95%.

The dibutyl sulfate may be separated from the polymer present by a procedure similar to that described above, using a higher temperature and, preferably, a subatmospheric pressure to effect vaporization of the polymer in the presence of the neutralizing agent. Where the dibutyl sulfate is to be converted to secondary butyl alcohol, the separation may be effected by adding to the mixture a weak acid, an acid solution of an alcohol, preferably of secondary butyl alcohol, an alkyl hydrogen sulfate solution, or water and heating the resulting mixture, whereby the dibutyl sulfate is transformed to the corresponding secondary alcohol dissolved in weak sulfuric acid. Alternatively the dibutyl sulfate may be treated with regulated amounts of stronger acid, for example, sulfuric acid of about 60 to 100% strength, whereby the neutral ester may be converted to butyl hydrogen sulfate. In either case, the polymers may be readily separated from the resulting water soluble products by stratification and decantation and/or distillation and the like. The alcohol yield may thus be materially increased and the polymers recovered in a substantially pure form suitable for use as motor fuel of high anti-knock value.

The invention may be carried out in many other ways. Thus, for example, the hydrocarbon layer separated from the "acid liquor" after olefine absorption may be passed through a column of caustic soda solution to neutralize the free acidity and then, preferably after pre-heating, be fed to a continuous distillation column along with the same, or another, sodium hydroxide solution to keep it on the alkaline side of neutrality during distillation. The vapors from the top of the column may be compressed and/or condensed in the usual manner while the concentrate from the still-kettle may be passed through a product cooler and thence to a separator wherein the polymer-dibutyl sulfate layer is separated from the caustic soda. Various other arrangements of apparatus and methods of procedure may be employed. Either superatmospheric, atmospheric or subatmospheric pressures may be used. The use of subatmospheric pressures is particularly advantageous where hydrocarbons of boiling points near or above 180° F. are to be separated.

The other conditions of operation should likewise be adjusted to the character and composition of the hydrocarbon mixture being treated. The amount of neutralizing agent which will be required depends upon the amount of free acid present which may vary widely. I find it preferable, therefore, to operate with an excess of neutralizing agent at all times, as control of the operations is thus greatly simplified. Since the decomposition of dialkyl sulfates is autocatalytic and hence increases very rapidly if a condition of even slight acidity is allowed to develop during heating, it is important, as a matter of safety and plant protection against corrosion as well as of economy, that the operations be carried out, as far as possible, under conditions of positive alkalinity.

The temperature of heating and/or distillation of the alkalized hydrocarbon mixture will also depend upon the nature of the poly or neutral alkyl esters and/or hydrocarbons. For effective separation either higher temperatures and short times of heating or lower temperatures and more thorough refluxing may be used. In any case, excessive periods of heating of the poly or neutral alkyl esters are preferably avoided as decomposition is promoted thereby. With a kettle temperature of 175° F. and a time of residence in vaporizer 4 of about 5 minutes, the butane recovery in the above described example was 96.5%.

Other suitable neutralizing agents such as potassium hydroxide, calcium hydroxide, lime, sodium bicarbonate, sodium carbonate, ammonia, and the like, may be used in place of the caustic soda described in the foregoing example. Such neutralizing agents are preferably used in the form of aqueous solutions or suspensions as more through contact with the hydrocarbons is usually possible thereby. But other methods of addition may be resorted to, as for example, the use of ammonia in the gaseous or liquid anhydrous form, or the use of solid neutralizing agents. I find it preferable to employ relatively dilute, i. e. 5 to 20%, solutions of such agents but any desired concentration may be used.

In the above description and appended claims, the term "hydrocarbon layer", when used to apply to the starting material for my process, is to be understood as including any hydrocarbon layer separated from an acid liquor produced by absorption of an olefine or olefines in an acid-acting medium, irrespective of any other treatment, such as hydrolysis, etc., which may be carried out prior to the separation of such a hydrocarbon layer.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process for the recovery of a hydrocarbon from an alkyl ester-hydrocarbon mixture separated from an absorption product of an olefine in a mineral acid acting acid which comprises vaporizing at least a part of the hydrocarbon content of said mixture at a temperature not substantially higher than 180° F. in the presence of a neutralizing agent and removing the substantially undecomposed alkyl ester content with the remainder.

2. A process for separating a hydrocarbon from admixture with an alkyl ester separated from an absorption product of an olefine in a mineral acid acting acid which comprises heating the alkyl ester-hydrocarbon mixture in the presence of a neutralizing agent to a temperature not substantially higher than about 180° F. and subsequently vaporizing at least a part of the hydrocarbon present.

3. A process for the recovery of a hydrocarbon from admixture with acid containing polymers and an alkyl ester separated from an absorption product of an olefine in a mineral acid acting acid which comprises vaporizing substantially the unpolymerized hydrocarbon content of said mixture at a temperature not substantially higher than 180° F. in the presence of an agent capable of neutralizing the acid present therein and removing together the polymer and alkyl ester content.

4. A process for the recovery of a hydrocarbon from an acid hydrocarbon layer separated from an absorption product of an olefine in a mineral acid acting acid which comprises neutralizing said hydrocarbon layer and distilling hydrocarbon therefrom while maintaining a temperature and an alkaline conditon therein at which decomposition of alkyl ester present is substantially inhibited.

5. A process for the recovery of a hydrocarbon from a hydrocarbon layer separated from an absorption product of an olefine in a mineral acid acting acid which comprises mixing said hydrocarbon layer with an alkaline agent and heating the resulting mixture to a temperature and for a time at which hydrocarbon is vaporized therefrom without substantial decomposition of alkyl ester contained therein.

6. A process for the recovery of a hydrocarbon from a hydrocarbon layer separated from an absorption product of an olefine in a mineral acid acting acid which comprises treating said hydrocarbon layer with an excess of an acid neutralizing agent and distilling the resulting mixture to remove therefrom the unpolymerized hydrocarbon content without substantial decomposition of alkyl ester contained therein.

7. A process for the recovery of a hydrocarbon from a hydrocarbon layer separated from an absorption product of an olefine in a mineral acid acting acid which comprises vaporizing part of the hydrocarbon content thereof in the presence of an aqueous solution of an alakali metal base stratifying the remaining mixture into a hydrocarbon phase and an aqueous alkaline phase and removing the hydrocarbon phase from the system.

8. A process for the recovery of a hydrocarbon from a hydrocarbon layer separated from an absorption product of an olefine in a mineral acid acting acid which comprises vaporizing substantially the unpolymerized hydrocarbon content thereof in the presence of an aqueous solution of sodium hydroxide stratifying the remaining mixture into a hydrocarbon phase and an aqueous alkaline phase and removing the hydrocarbon phase from the system.

9. A process for the recovery of a hydrocarbon from an alkali ester containing hydrocarbon layer separated from an absorption product of an olefine in a mineral acid acting acid which comprises treating said hydrocarbon layer with a neutralizing agent, vaporizing at least a part of the hydrocarbon content of said layer at a temperature not substantially higher than 180° F. in the presence of said neutralizing agent separating the vaporized hydrocarbon from the unvolatilized components present and recovering substantially the alkyl ester content of the hydrocarbon layer from the latter.

10. A process for the recovery of butane from admixture with dibutyl sulfate and butene polymers which comprises vaporizing the butane content of said mixture in the presence of sodium hydroxide at a temperature of not more than 180° F. and recovering substantially the di-butyl sulfate content of the mixture.

11. A process for the recovery of a hydrocarbon from a dialkyl sulfate containing hydrocarbon layer separated from an absorption product of an olefine in sulfuric acid which comprises vaporizing at least a part of the hydrocarbon content thereof in the presence of a solution of an alkaline agent at a temperature not substantially higher than 180° F., separating the volatilized hydrocarbon from the unvolatilized alkaline solution, cooling and condensing the hydrocarbon vapors and recovering substantially the dialkyl sulfate content of the hydrocarbon layer from said unvolatilized alkaline solution.

12. In a process for the recovery of a hydrocarbon from a polymer and poly-alkyl ester containing hydrocarbon layer separated from an absorption product of an olefine in a mineral acid acting acid, the steps of separating hydrocarbon from other components of said layer by vaporization of at least a part of the hydrocarbon content thereof at a temperature of not more than 180° F. in the presence of an alkaline agent, removing the unvolatilized alkaline mixture and recovering polymer and poly-alkali ester therefrom.

13. In a process for the recovery of a hydrocarbon from a poly-alkyl ester containing hydrocarbon layer separated from an absorption product of an olefine in a mineral acid acting acid, the steps of separating hydrocarbon from other components of said layer by vaporization of at least a part of the hydrocarbon content thereof in the presence of an alkaline agent at a temperature not substantially higher than 180° F., removing the unvolatilized alkaline mixture and converting the poly-alkyl ester content thereof to alcohol.

14. In a process for the recovery of a poly-alkyl ester containing hydrocarbon from a hydrocarbon layer separated from an absorption product of an olefine in a mineral acid acting acid, the steps of preheating said hydrocarbon layer in the presence of an alkaline solution, expanding the heated mixture of hydrocarbons and alkaline solution into a separator wherein at least a part of the hydrocarbons are removed as vapor, water-washing and alkali-scrubbing the removed vapors and recovering substantially the poly-alkyl ester content of the hydrocarbon layer from admixture with the alkaline solution.

WILLIAM ENGS.

CERTIFICATE OF CORRECTION.

Patent No. 2,066,461. January 5, 1937.

WILLIAM ENGS.

It is hereby certified that error appears in the printed specification of the above numbered patent requiring correction as follows: Page 4, first column, line 33, claim 9, for the word "alkali" read alkyl; and that the said Letters Patent should be read with this correction therein that the same may conform to the record of the case in the Patent Office.

Signed and sealed this 11th day of January, A. D. 1938.

(Seal)

Henry Van Arsdale,
Acting Commissioner of Patents.

from without substantial decomposition of alkyl ester contained therein.

6. A process for the recovery of a hydrocarbon from a hydrocarbon layer separated from an absorption product of an olefine in a mineral acid acting acid which comprises treating said hydrocarbon layer with an excess of an acid neutralizing agent and distilling the resulting mixture to remove therefrom the unpolymerized hydrocarbon content without substantial decomposition of alkyl ester contained therein.

7. A process for the recovery of a hydrocarbon from a hydrocarbon layer separated from an absorption product of an olefine in a mineral acid acting acid which comprises vaporizing part of the hydrocarbon content thereof in the presence of an aqueous solution of an alakali metal base stratifying the remaining mixture into a hydrocarbon phase and an aqueous alkaline phase and removing the hydrocarbon phase from the system.

8. A process for the recovery of a hydrocarbon from a hydrocarbon layer separated from an absorption product of an olefine in a mineral acid acting acid which comprises vaporizing substantially the unpolymerized hydrocarbon content thereof in the presence of an aqueous solution of sodium hydroxide stratifying the remaining mixture into a hydrocarbon phase and an aqueous alkaline phase and removing the hydrocarbon phase from the system.

9. A process for the recovery of a hydrocarbon from an alkali ester containing hydrocarbon layer separated from an absorption product of an olefine in a mineral acid acting acid which comprises treating said hydrocarbon layer with a neutralizing agent, vaporizing at least a part of the hydrocarbon content of said layer at a temperature not substantially higher than 180° F. in the presence of said neutralizing agent separating the vaporized hydrocarbon from the unvolatilized components present and recovering substantially the alkyl ester content of the hydrocarbon layer from the latter.

10. A process for the recovery of butane from admixture with dibutyl sulfate and butene polymers which comprises vaporizing the butane content of said mixture in the presence of sodium hydroxide at a temperature of not more than 180° F. and recovering substantially the di-butyl sulfate content of the mixture.

11. A process for the recovery of a hydrocarbon from a dialkyl sulfate containing hydrocarbon layer separated from an absorption product of an olefine in sulfuric acid which comprises vaporizing at least a part of the hydrocarbon content thereof in the presence of a solution of an alkaline agent at a temperature not substantially higher than 180° F., separating the volatilized hydrocarbon from the unvolatilized alkaline solution, cooling and condensing the hydrocarbon vapors and recovering substantially the dialkyl sulfate content of the hydrocarbon layer from said unvolatilized alkaline solution.

12. In a process for the recovery of a hydrocarbon from a polymer and poly-alkyl ester containing hydrocarbon layer separated from an absorption product of an olefine in a mineral acid acting acid, the steps of separating hydrocarbon from other components of said layer by vaporization of at least a part of the hydrocarbon content thereof at a temperature of not more than 180° F. in the presence of an alkaline agent, removing the unvolatilized alkaline mixture and recovering polymer and poly-alkali ester therefrom.

13. In a process for the recovery of a hydrocarbon from a poly-alkyl ester containing hydrocarbon layer separated from an absorption product of an olefine in a mineral acid acting acid, the steps of separating hydrocarbon from other components of said layer by vaporization of at least a part of the hydrocarbon content thereof in the presence of an alkaline agent at a temperature not substantially higher than 180° F., removing the unvolatilized alkaline mixture and converting the poly-alkyl ester content thereof to alcohol.

14. In a process for the recovery of a poly-alkyl ester containing hydrocarbon from a hydrocarbon layer separated from an absorption product of an olefine in a mineral acid acting acid, the steps of preheating said hydrocarbon layer in the presence of an alkaline solution, expanding the heated mixture of hydrocarbons and alkaline solution into a separator wherein at least a part of the hydrocarbons are removed as vapor, water-washing and alkali-scrubbing the removed vapors and recovering substantially the poly-alkyl ester content of the hydrocarbon layer from admixture with the alkaline solution.

WILLIAM ENGS.

---

CERTIFICATE OF CORRECTION.

Patent No. 2,066,461.   January 5, 1937.

WILLIAM ENGS.

It is hereby certified that error appears in the printed specification of the above numbered patent requiring correction as follows: Page 4, first column, line 33, claim 9, for the word "alkali" read alkyl; and that the said Letters Patent should be read with this correction therein that the same may conform to the record of the case in the Patent Office.

Signed and sealed this 11th day of January, A. D. 1938.

(Seal)

Henry Van Arsdale,
Acting Commissioner of Patents.

CERTIFICATE OF CORRECTION.

Patent No. 2,066,461.  January 5, 1937.

WILLIAM ENGS.

It is hereby certified that error appears in the printed specification of the above numbered patent requiring correction as follows: Page 4, first column, line 33, claim 9, for the word "alkali" read alkyl; and that the said Letters Patent should be read with this correction therein that the same may conform to the record of the case in the Patent Office.

Signed and sealed this 11th day of January, A. D. 1938.

(Seal)

Henry Van Arsdale,
Acting Commissioner of Patents.